March 31, 1936.  N. F. F. ANDERSSON  2,035,448
APPARATUS FOR CUTTING SHEET METAL OR THE LIKE
Filed July 28, 1933   5 Sheets-Sheet 1
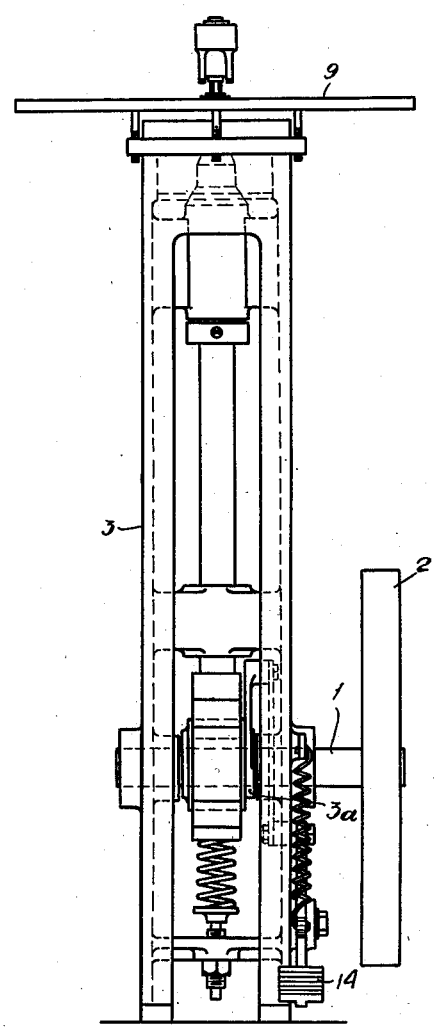
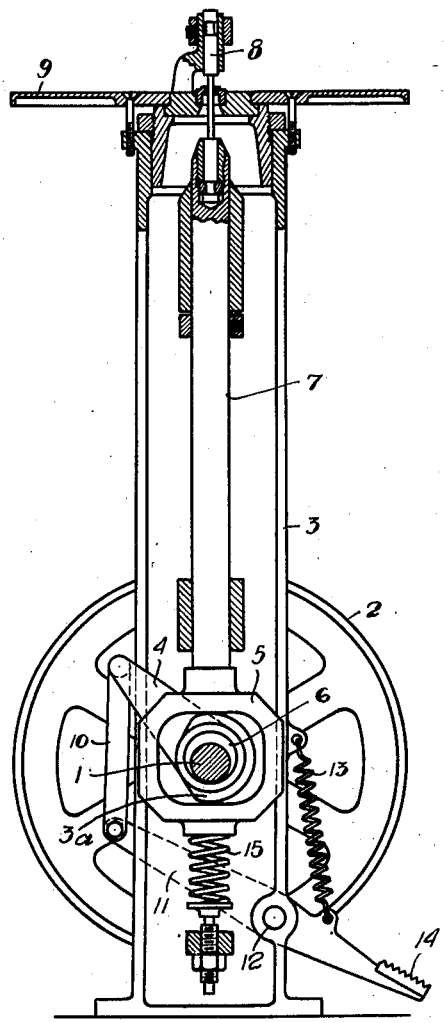
INVENTOR
Nils Fredrik Filemon Andersson
BY
N. J. Hedlund
his ATTORNEY

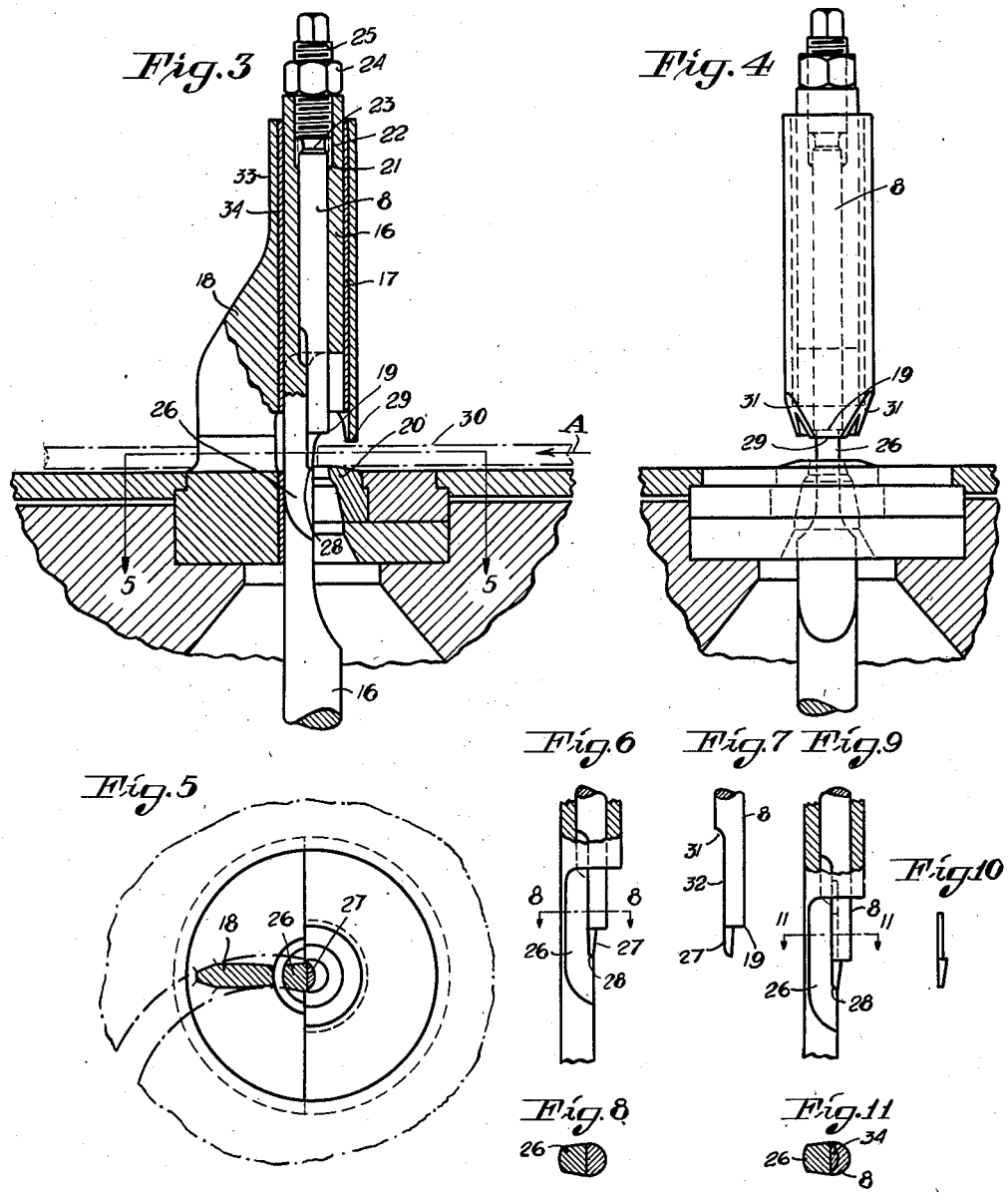

March 31, 1936.  N. F. F. ANDERSSON  2,035,448
APPARATUS FOR CUTTING SHEET METAL OR THE LIKE
Filed July 28, 1933   5 Sheets-Sheet 3
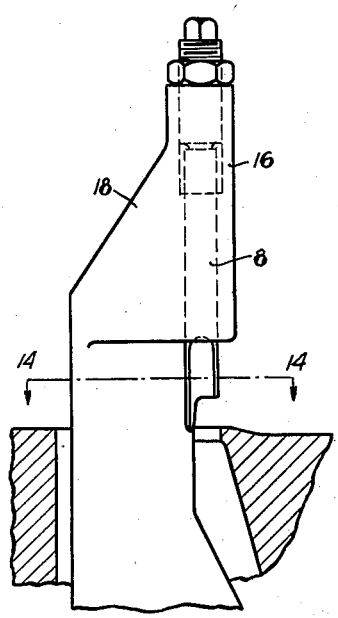
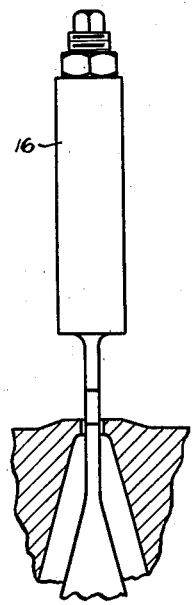
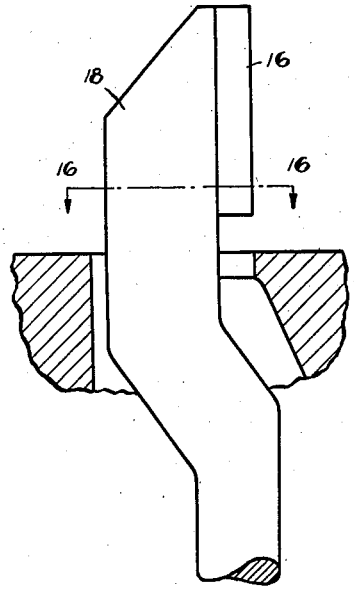
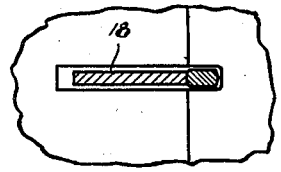
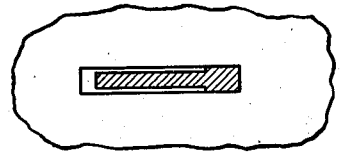

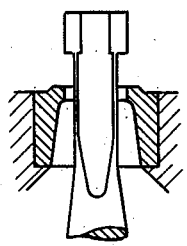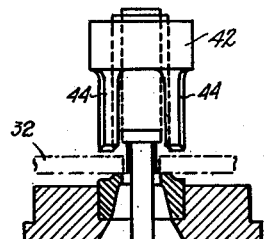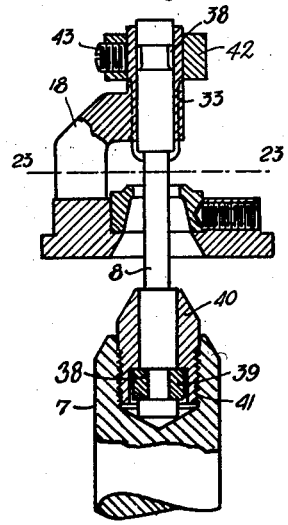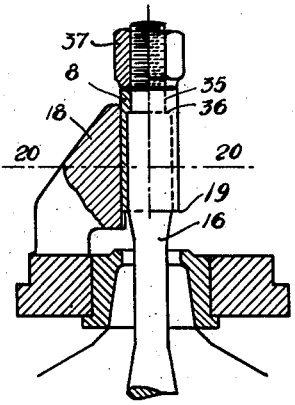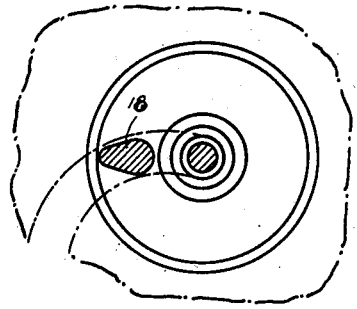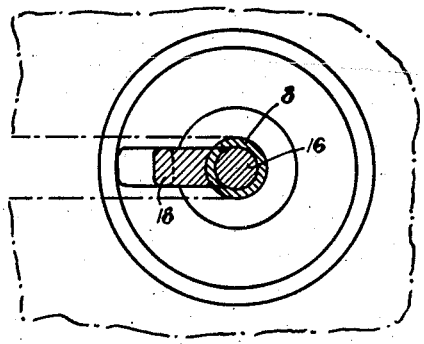

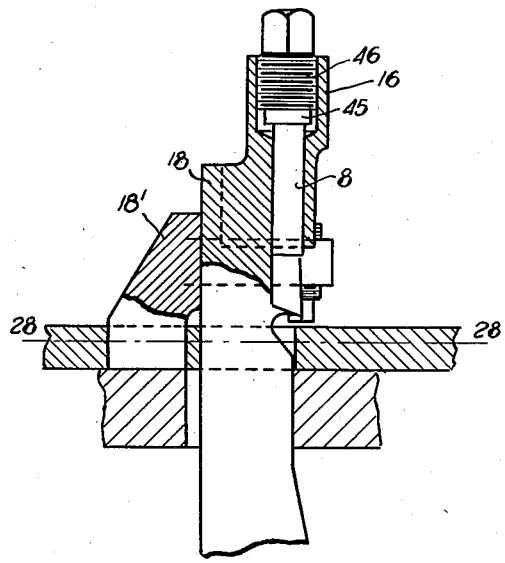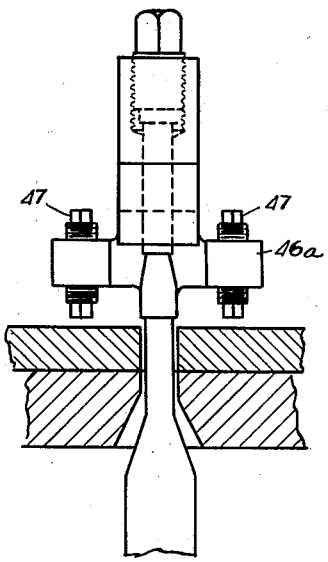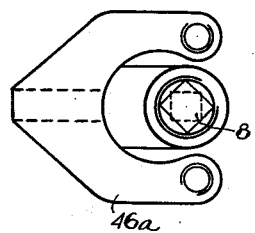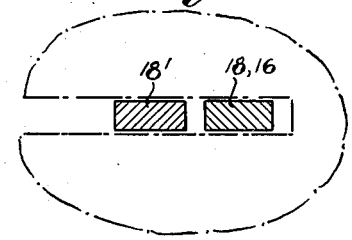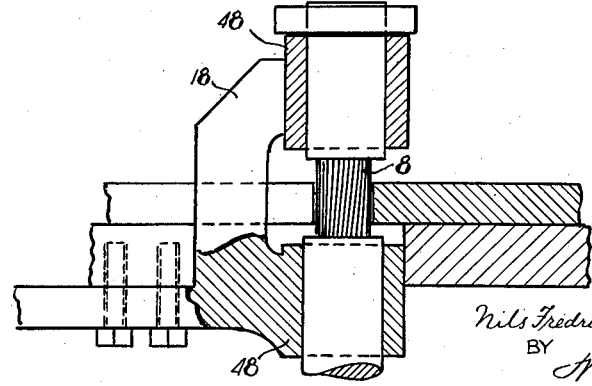

Patented Mar. 31, 1936

2,035,448

UNITED STATES PATENT OFFICE 2,035,448

APPARATUS FOR CUTTING SHEET METAL OR THE LIKE

Nils Fredrik Filemon Andersson, Kappala, Lidingo, Sweden

Application July 28, 1933, Serial No. 682,554
In Sweden August 5, 1932

23 Claims. (Cl. 164—47)

The present invention refers to means for the working of metals, wood or the like with the aid of a cutting tool, and more particularly relates to an arrangement where the longitudinal axis of the tool forms an angle with the relative feeding direction between the work piece and the tool, and wherein the tool is braced by supporting means extending through the work piece.

A principal distinguishing feature of the invention resides in the provision of a tool holder actuated by suitable mechanism located to one side of the plane of a work piece and extending through the plane of the work piece, with a cutting tool held in the portion of the tool holder on the side of the plane of the work piece opposite the side thereof where the actuating mechanism for the tool holder is located, coupled with means for supporting the tool holder in the direction of feed of the work. A further distinguishing feature is the provision of a reciprocating tool holder of the above described character, coupled with stationary bracing means which passes through the plane of the work piece. A further feature is the provision of tool holder and bracing means in which the cross sectional dimension in the direction of feed of the work is greater than the cutting width of the tool, whereby to permit the tool holder and the bracing means to pass readily through a slot cut in the work piece by the tool. The bracing means in some instances may be integral with the tool holder.

By this arrangement, the tensile and bending stresses incurred by the working operation of the tool are concentrated in the tool holder with the bending stresses compensated for by the bracing means, while the only stress to which the tool itself is subjected is that of compression.

The invention is particularly applicable to the kind of metal cutting machine commonly known commercially as a nibbling machine, in which a work table is provided for the sheet of metal or other material to be cut and above which the cutting tool is located.

Further features characteristic of the invention will be described more fully in the following with reference to the accompanying drawings, which by way of example illustrate a few embodiments of cutting tools and means for the operation thereof, according to the invention.

In the drawings,

Figure 1 is an elevation of a nibbling machine operating a reciprocating cutting tool with supporting means therefor according to the invention;

Fig. 2 is a side view, partly in section, and taken at right angles to Fig. 1;

Fig. 3 is an elevation, partly in longitudinal section, showing a preferred embodiment of a reciprocating cutting tool with its tool holder and a separate supporting means therefor;

Fig. 4 is a view taken at right angles to Fig. 3;

Fig. 5 is a cross section on line 5—5 in Fig. 3;

Figs. 6, 7 and 8 are detail views of parts shown in Fig. 3, Fig. 8 being a cross section on line 8—8 in Fig. 6;

Figs. 9, 10 and 11 are detail views of modifications of the parts illustrated in Figs. 6–8, Fig. 11 being a cross section on line 11—11 in Fig. 9;

Fig. 12 is an elevation showing the tool in a tool holder of modified construction integral with the supporting means;

Fig. 13 is a view taken at right angles to Fig. 12;

Fig. 14 is a cross section on line 14—14 in Fig. 12;

Fig. 15 is an elevation of a modification of the arrangement shown in Fig. 12, the tool being made integral with the tool holder and the support;

Fig. 16 is a cross section on the line 16—16 in Fig. 15;

Fig. 17 is an elevation of a tool according to a further embodiment;

Fig. 18 is an end view of Fig. 17;

Fig. 19 is a sectional view of a further embodiment of a cutting tool supported by a separate support;

Fig. 20 is a cross section on line 20—20 in Fig. 19;

Fig. 21 is an elevation, partly in longitudinal section, of a reciprocating cutting tool adapted to be reversed in the machine operating the same;

Fig. 22 is a view taken at right angles to Fig. 21;

Fig. 23 is a cross section on line 23—23 in Fig. 21;

Fig. 24 shows the shape of the shavings cut off the work piece by the majority of the aforementioned tools;

Fig. 25 is a longitudinal section of a tool holder with a supporting means comprising a supporting ridge integral with the tool holder and an additional separate supporting bracket therebehind;

Fig. 26 is an elevation at right angles to Fig. 25;

Fig. 27 is a plan view of Fig. 26;

Fig. 28 is a cross section on line 28—28 in Fig. 25; and

Fig. 29 shows a rotary tool.

The same reference numerals indicate corresponding parts throughout the drawings.

With reference to Figs. 1 and 2, 1 designates a driving shaft mounted in the lower part of a frame 3 and driven by power transmission over a pulley 2, or in some other suitable manner. A cam-sleeve 3a with a projecting arm 4 engages an opening in a slide member 5 adapted to slide up and down in the frame 3, and is operatively connected with the shaft 1 by means of an eccentric 6 thereon. The slide member 5 is connected to a vertical rod 7, to the upper end of which is secured a cutting tool 8 projecting through the work table 9 and adapted to perform a reciprocating movement.

Movably connected to the arm 4 is a link 10 which, in turn, is movably connected to a treadle lever 11 pivoted in the frame 3 as at 12. The one end of a tension spring 13 is secured to the frame 3 and the other end thereof to the treadle lever 11 at a point between the pivot 12 and the treadle 14.

When the treadle 14 is depressed into its down-position against the tension of the spring 13, the arm 4 will be raised to bring the cam sleeve 3a into the operative position shown in the drawings, whereas, when the treadle is relieved of the pressure thereon, the spring 13 will cause a movement of the linkage 11, 10 to bring down the arm 4 into horizontal position, so that the slide member 5, which is now unhampered by the cam portion of the sleeve 3a, is free to move upwardly under the influence of the coil spring 15, until the inner lower surface of the slide member 5 is brought flush with the lower edge of the arm 4, so as to raise the rod 7 and the tool 8 secured therein out of operative range of the work-piece seated on the table 9.

According to Figs. 3 and 6–8, the tool 8 is of substantially cylindrical shape, the lower part of the tool being recessed, as at 31, and provided with a centrally depending, nose-like projection 27, the cutting part of the tool being formed by the circular base line 19 in front of the projection 27.

The tool is inserted from above into a central bore of the tool holder, the flat rear surface 32 of the lower portion of the tool sliding on a corresponding surface of the narrow stem 26 of the tool holder, until the projection 27 is seated in a corresponding recess 28 in the stem portion 26. The bore of the tool holder receiving the tool 8 with a snug fit is continued upwardly, from the level at 21, by a wider threaded bore 22 receiving a stop screw 25 having an abutment 23 at the lower end thereof. The stop screw 25 is screwed down until its abutment 23 bears on the upper end of the tool 8, and is then secured in place by means of the lock nut 24, the tool being now ready for cooperation, through a reciprocating movement, with the die 20 of the work table.

In operation, the work piece 30, consisting of sheet metal, for example, is fed over the die 20 in the direction of the arrow A into the path of the tool, falciform shavings of the shape according to Fig. 24 being then cut off the work piece on every reciprocating movement of the tool holder and the tool secured therein, so as to produce a rectilinear or curved slot, as the case may be, in the work piece.

To take up the severe bending strains to which the tool is subjected in the cutting operation, there is provided behind the tool holder, in the feeding direction of the work-piece, an additional support for the tool in the form of a fin-like ridge or bracket 18 integral with a sleeve 33 surrounding the tool holder through the intermediary of a bushing 34, said ridge or bracket being secured in the work-table to brace the tool in the feeding direction. As will be seen from Fig. 5, the supporting bracket 18 is of a width slightly less than that of the cutting part of the tool, while in the feeding direction and in the plane of the work-piece (Fig. 3) the sum of the linear dimensions of the tool and the entire supporting means therefor is greater than the width of the cutting part of the tool. By this means great rigidness is obtained in the feeding direction of the working plane, where it is most required, and the tool will not be apt to break even when working through the heaviest grades of sheet metal. It will be seen from Fig. 5 that the cross-section of the supporting bracket 18 is of such a shape as not to restrict the operation of the tool to the cutting of a straight slot in the work piece, it being also feasible within certain limits to cut curved slots therein.

The work-piece is prevented from following with the tool in its upward return movement by the lower front portion 29 of the sleeve 33 which terminates at a short distance above the work-piece. From said front portion, the sleeve 33 is bevelled-off upwardly, as at 31 (Fig. 4), so as not to obstruct the view of the tool operating on the work piece.

With further reference to Figs. 6 and 7, the real object of the depending nose 27 is to form a protection for the stem 26 of the work holder against the abrading action of the edge of the work piece when the latter is being fed against the tool and the tool holder, and to this end said depending nose is specially tempered to withstand abrasion by the work piece.

Instead of having the protecting piece 27 secured to the tool or made integral therewith, it is possible to make it exchangeable by shaping it according to Fig. 10, and to seat in the recess 28 of the tool holder (Fig. 9) where it is kept in place by the channelled lower part of the tool receiving its correspondingly shaped stem portion 34 (Fig. 11).

According to Figs. 12, 13, and 14, the tool 8 is inserted into a tool holder 16 integral with the supporting ridge 18 adapted to take up the bending moments caused in the operation of the tool. Here, the supporting ridge 18 is of the same general shape as the supporting bracket shown in Figs. 3–5, the substantial difference being that the support reciprocates with the tool holder integral therewith, instead of being firmly secured and receiving a tool holder movable therein as in Figs. 3–5.

Figs. 15 and 16 show a further simplification of the arrangement disclosed in Figs. 12–14, the cutting tool 8 and its holder 16 being made in one piece which is integral with the supporting ridge 18. Here, as in the case of Figs. 12–14, the whole structure reciprocates in the slot cut into the work piece, at an angle to the latter. The cross section of the tool or tool holder is shown to be rectangular, the cutting edges being thus straight so as to chip off shavings of a substantially parallelepiped shape from the work piece.

Figs. 17 and 18 show a tool made from a cylindrical spindle bevelled off on diametrically opposite sides.

Figs. 19 and 20 illustrate a tool consisting of a sleeve 8 provided with an upper neck 35 resting on a shoulder 36 of the tool holder 16, the upper threaded end of which projects through the neck 35. The sleeve 8 is secured in place by means of a nut 37 screwed down on the threaded portion of the tool holder to bear on the upper end of the sleeve. The cutting part of the tool is formed by the outer circular base line 19 of the sleeve on the side opposite to the stiffening support 18 adapted to take up the bending strains caused in the cutting operation. As in the case of Fig. 3, the support 18 in the form of an angular bracket is firmly secured to the work table, the difference being that here the reciprocating tool itself is in frictional engagement with the support. It will be understood that as the cutting edge is wearing down in the course of work, the nut 37 may be loosened and the sleeve turned on its holder to bring another, unworn portion of the outer base line of the sleeve into working position.

Figs. 21–23 show a tool which is of the same construction at both ends and which when worn in the one end can be turned for using the other end thereof. The tool 8 is secured in the upper end of the vertical rod 7 of the operating machine by means of a split ring 39 engaging a circumferential recess 38 provided near both ends of the tool 8, which ring 39 is also received by a recess in the end of a cylindrical hollow member 40 which surrounds the tool and is provided with external threads 41 engaging corresponding threads of a cylindrical bore in the upper end of the rod 7. In this embodiment also the tool itself reciprocates in frictional engagement with a support, which latter here takes the form of a surrounding sleeve 33 integral with an angular bracket 18 secured to the work table, the same as in Fig. 3.

Secured to the upper end of the tool by means of a set screw 43 is a ring 42 with two depending legs 44, which latter serve to prevent the work piece from following with the tool in its upward movement.

In the drawings, the cross section of the stiffening support 18 is shown to be of an oval shape, but obviously it may be of any other suitable form, such as circular, for instance.

Figs. 25–28 show a further embodiment of a reciprocating tool with its accessories. The tool 8, which according to the drawings is of square cross section, is inserted from above into the tool holder 16, the head 45 of the tool resting in a recess in the upper part of the tool holder and the tool being kept in place by a screw 46 bearing on the head 45. The tool holder 16 is integral with a stiffening part 18 backed by a bracing bracket 18¹ which is in frictional engagement with the part 18 and secured in the work table, parts 18 and 18¹ thus forming together the entire supporting means taking up the bending strains caused in the cutting operation. The portions of the parts 18 and 18¹ adjacent to the working plane are so dimensioned as to permit of being received by the slot cut into the work piece, as shown in Fig. 28.

Attached to the tool holder 16 is a bridge member 46a carrying two vertical screws 47 which may be adjusted so that their lower ends are set to a suitable distance from the work piece to prevent the latter from following with the tool in its upward return movement.

It will be observed from the drawings that in the forms of apparatus in which the reciprocating tool holder is guided by a stationary sleeve or the like such sleeve provides a guide the length of which is several times the cutting width of the tool in order to provide substantial guiding support for the tool holder. Preferably such guiding sleeves have a length at least twice that of the cutting width of the tool.

All of the tools described hereinbefore are reciprocating ones, but the invention is applicable just as well to rotary tools answering the requirements that the longitudinal direction of the tool form an angle with the relative feeding direction between the work piece and the tool, and that the tool be braced by a supporting means extending through the work piece. An example of a rotary tool of this type is illustrated in Fig. 29 of the drawings, the tool 8 being journalled in bearings 48 carried by a supporting yoke 18 which is secured in the work table 9, the tool and yoke both extending through the table.

What I claim is:—

1. In apparatus for cutting sheet metal or the like, the combination of an elongated hollow substantially cylindrical tool holder adapted to pass through a slot cut in a work piece and to receive a tool substantially in axial alignment with the tool holder, a cutting tool removably held in and actuated by said tool holder, a bracing bracket secured to a work support, and a sleeve integral with said bracket and surrounding said tool holder for stiffening the same substantially in the direction of feed of the work piece, the lower front portion of said sleeve providing an abutment adjacent to the work piece for preventing the work piece from following with the tool on its idle strokes of reciprocation.

2. In apparatus for cutting sheet metal or the like, the combination of an elongated hollow substantially cylindrical tool holder adapted to pass through a slot cut in a work piece and to receive a tool substantially in axial alignment with the tool holder, a cutting tool removably held in and actuated by said tool holder, a bracing bracket secured to a work support, and a sleeve integral with said bracket and surrounding said tool holder for stiffening the same substantially in the direction of feed of the work piece, the lower forward edge of said sleeve being beveled to permit observation of the tool when in the cutting position thereof.

3. In apparatus for cutting sheet metal or the like, the combination of an elongated hollow substantially cylindrical tool holder adapted to extend at an angle through a work piece and to receive a tool substantially in axial alignment with the tool holder, a cutting tool removably held by said tool holder, a bracing bracket secured to a work support, and a sleeve integral with said bracket and surrounding said tool holder for stiffening the same substantially in the direction of feed of the work piece, said tool holder having a recess and protecting means for the tool holder comprising a part seated in said recess, said part being retained in position by said tool.

4. In apparatus for cutting sheet metal or the like, the combination of a reciprocating tool holder adapted to extend at an angle through a work piece, a cutting tool removably held by said tool holder, and a bracing part for stiffening the tool holder substantially in the direction of feed of the work piece, said bracing part being integral with the tool holder and being adapted to pass through the slot cut in the work piece by the tool.

5. In apparatus for cutting sheet metal or the like, the combination of a reciprocating tool holder adapted to extend at an angle through a work piece and having a threaded and shouldered upper end, an annular sleeve-like cutting tool having an upper threaded portion adapted to engage the shoulder of the tool holder with the upper threaded end of the tool holder projecting above the upper end of the tool, a nut threaded on the upper end of the tool holder for retaining the tool in engagement with the holder, and a stationary fin-like bracing bracket for stiffening the tool holder and tool in the direction of feed of the work piece.

6. In apparatus for cutting sheet metal or the like, actuating mechanism, a tool holder operatively connected with and adapted to be reciprocated by said mechanism, said tool holder having a portion passing through the plane of cutting of a work piece and adapted to pass through a slot cut in the work piece and an end portion on the side of said plane opposite said mechanism, and a cutting tool removably secured to said end portion of the tool holder.

7. In apparatus for cutting sheet metal or the like, actuating mechanism, a tool holder operatively connected with and adapted to be reciprocated by said mechanism, said tool holder having a portion passing through the plane of cutting of a work piece and adapted to pass through a slot cut in the work piece and an end portion on the side of said plane opposite said mechanism, a cutting tool removably secured to said end portion of the tool holder, and rigid bracing means extending through said plane adjacent to said tool holder for bracing said end portion.

8. In apparatus for cutting sheet metal or the like, actuating mechanism, a tool holder operatively connected with and adapted to be reciprocated by said mechanism, said tool holder having a portion of relatively small cross sectional area passing through the plane of cutting of a work piece and an enlarged end portion on the side of said plane opposite said mechanism, a cutting tool removably secured to said end portion, said tool having a cutting edge directed toward said plane and being adapted to be pulled through said plane on its cutting stroke by said tool holder, and bracing means passing through said plane for bracing said tool holder in the direction of feed of the work piece.

9. In apparatus for cutting sheet metal or the like, actuating mechanism, a tool holder operatively connected with and adapted to be reciprocated by said mechanism, said tool holder having a relatively narrow portion passing through the plane of cutting of a work piece and a sleeve-like end portion on the side of said plane opposite said mechanism, a cutting tool removably secured in the bore of said sleeve-like portion and having a cutting edge directed toward said plane, and means extending through said plane adjacent to the line of reciprocation of said tool for bracing said end portion of the tool holder in the direction of feed of the work piece.

10. In apparatus for cutting sheet metal or the like, the combination of a reciprocating tool holder having a tool holding portion, a portion adapted to be connected to actuating mechanism and an intermediate portion adapted to pass through a slot cut in a work piece, and a cutting tool removably held by the first mentioned portion of said tool holder.

11. In apparatus for cutting sheet metal or the like, the combination of a reciprocating tool holder having a tool holding portion, a portion adapted to be connected to actuating mechanism and an intermediate portion adapted to pass through a slot cut in a work piece, a cutting tool removably held by said tool holding portion, and bracing means adapted to extend through said slot for stiffening the tool holder substantially in the direction of feed of the work piece.

12. In apparatus for cutting sheet metal or the like, the combination of a reciprocating tool holder having a tool holding portion, a portion adapted to be connected to actuating mechanism and an intermediate portion adapted to pass through a slot cut in a work piece, a cutting tool removably held by said tool holding portion and a stationary bracing bracket adapted to extend through said slot in the work piece for bracing said tool holder substantially in the direction of feed of the work piece.

13. In apparatus for cutting sheet metal or the like, the combination of a tool holder having an elongated hollow substantially cylindrical tool holding portion, a portion adapted to be connected to actuating mechanism and an intermediate portion adapted to pass through a slot cut in a work piece, a cutting tool removably held in the bore of said hollow tool holding portion, a bracing bracket secured to a work support and adapted to pass through said slot and a sleeve integral with said bracket and surrounding the work holding portion of the tool holder for stiffening the tool holder substantially in the direction of feed of the work piece.

14. In apparatus for cutting sheet metal or the like, the combination of a tool holder having an elongated hollow substantially cylindrical tool holding portion, a portion adapted to be connected to actuating mechanism and an intermediate portion adapted to pass through a slot cut in a work piece, a cutting tool removably held in the bore of said hollow tool holding portion, a bracing bracket secured to a work support and adapted to pass through said slot and a sleeve integral with said bracket and surrounding the work holding portion of the tool holder for stiffening the tool holder substantially in the direction of feed of the work piece, said sleeve having a guiding length at least twice as long as the cutting width of the tool.

15. In apparatus for cutting sheet metal or the like, the combination of a tool holder having an elongated hollow substantially cylindrical tool holding portion, a portion adapted to be connected to actuating mechanism and an intermediate portion adapted to pass through a slot cut in a work piece, a cutting tool removably held in the bore of said hollow tool holding portion, said tool having a depending nose-like projection providing protection for said intermediate portion of the tool holder against the abrading action of the work piece when the latter is fed toward the tool and tool holder, a bracing bracket secured to a work support and adapted to pass through said slot, and a sleeve integral with said bracket and surrounding said tool holder for stiffening the same substantially in the direction of feed of the work piece.

16. In apparatus for cutting sheet metal or the like, the combination of a tool holder having a shouldered and threaded tool holding portion, a portion adapted to be connected to actuating mechanism and an intermediate portion adapted to pass through a slot cut in a work piece, an annular sleeve-like hollow cutting tool having an upper shouldered portion adapted to engage the shoulder of the tool holder with the upper threaded end of the tool holder projecting above the upper end of the tool, and a nut threaded on the upper end of the tool holder for retaining the tool in engagement with the holder.

17. In a nibbling machine, a work table for supporting a work piece, actuating mechanism located below the work table for reciprocating a tool holder, a tool holder connected to said mechanism below said table having an intermediate portion projecting through the plane of the work piece and adapted to pass through a slot cut in the work piece and a tool holding portion located above said plane, and a cutting tool removably held by the tool holding portion of said holder.

18. In a nibbling machine, a work table for supporting a work piece, actuating mechanism located below the work table for reciprocating a tool holder, a tool holder connected to said mechanism below said table having an intermediate portion projecting through the plane of the work piece and adapted to pass through a slot cut in the work piece and a tool holding portion located above said plane, a cutting tool removably held by the tool holding portion of said holder, and bracing means adapted to extend through said slot for stiffening the tool holder substantially in the direction of feed of the work piece.

19. In a nibbling machine, a work table for supporting a work piece, actuating mechanism located below the work table for reciprocating a tool holder, a tool holder connected to said mechanism below said table having an intermediate portion projecting through the plane of the work piece and adapted to pass through a slot cut in the work piece and a tool holding portion located above said plane, a cutting tool removably held by the tool holding portion of said holder, and a stationary bracing bracket adapted to extend through said slot in the work piece and engaging said tool holder above the work table for bracing the tool holder substantially in the direction of feed of the work piece.

20. In a nibbling machine, a work table for supporting a work piece, actuating mechanism located below the work table for reciprocating a tool holder, a tool holder connected to said mechanism below said table having an intermediate portion projecting through the plane of the work piece and adapted to pass through a slot cut in the work piece and a tool holding portion located above said plane, a cutting tool removably held by the tool holding portion of said holder, said tool having a projection depending below the cutting edge of the tool providing protection for the intermediate portion of the tool holder against the abrading action of the work piece when the latter is fed toward the tool and holder, and bracing means adapted to pass through the slot in the work piece for bracing said tool holder substantially in the direction of feed of the work piece.

21. In a nibbling machine, a work table for supporting a work piece, actuating mechanism located below the work table for reciprocating a tool holder, a tool holder comprising a portion connected to said actuating mechanism, an intermediate portion extending through the plane of the work table and adapted to pass through a slot cut in a work piece and a tool holding portion located above the work table, said tool holding portion having a bore substantially co-axial with the axis of reciprocation of the holder, a cutting tool removably held in said bore and having a cutting edge directed toward said table, and bracing means adapted to extend through a slot cut in the work piece for bracing said tool holder in the general direction of feed of the work piece.

22. In a nibbling machine, a work table for supporting a work piece, actuating mechanism located below the work table for reciprocating a tool holder, a tool holder comprising a portion connected to said actuating mechanism, an intermediate portion extending through the plane of the work table and adapted to pass through a slot cut in a work piece and a tool holding portion located above the work table, a cutting tool having an annular cutting edge directed toward said work table, means for removably securing said tool to the tool holding portion of said holder in different positions of rotation of the tool, and bracing means adapted to pass through a slot cut in the work piece for bracing the tool holder in the general direction of feed of the work piece.

23. In a nibbling machine, a work table for supporting a work piece, actuating mechanism located below the work table for reciprocating a tool holder, a tool holder comprising a portion connected to said actuating mechanism, an intermediate fin-like portion passing through the plane of the work piece and a tool holding portion located above the work table, said fin-like portion having a relatively long cross sectional dimension in the general direction of feed of the work piece and a relatively very narrow dimension transverse to the direction of feed of the work piece, and a cutting tool removably held in the tool holding portion of the holder, said fin-like intermediate portion providing bracing means for bracing the tool holder in the general direction of feed of the work piece.

NILS FREDRIK FILEMON ANDERSSON.